United States Patent [19]

Laude

[11] Patent Number: 4,819,224
[45] Date of Patent: Apr. 4, 1989

[54] WAVELENGTH MULTIPLEXER-DEMULTIPLEXER CORRECTED OF GEOMETRIC AND CHROMATIC ABERRATIONS

[75] Inventor: Jean-Pierre Laude, St. Cyr La Riviere par Saclas, France

[73] Assignee: Instruments S.A., France

[21] Appl. No.: 841,561

[22] Filed: Mar. 20, 1986

[30] Foreign Application Priority Data

Mar. 20, 1985 [FR] France .................................. 85 04134

[51] Int. Cl.⁴ .............................................. H04B 9/00
[52] U.S. Cl. .................................... 370/3; 350/96.18; 350/96.19
[58] Field of Search .............. 370/3; 350/96.15, 96.16, 350/96.18, 96.19; 356/332, 333, 334

[56] References Cited

U.S. PATENT DOCUMENTS

| | | | |
|---|---|---|---|
| 3,897,133 | 2/1975 | Warner et al. | 350/444 |
| 4,449,782 | 5/1984 | Korth | 370/3 |
| 4,622,662 | 11/1986 | Laude et al. | 370/3 |

FOREIGN PATENT DOCUMENTS

| | | |
|---|---|---|
| 0083542 | 7/1983 | European Pat. Off. . |
| 0099823 | 2/1984 | European Pat. Off. . |
| 0102264 | 3/1984 | European Pat. Off. . |
| 0115443 | 8/1984 | European Pat. Off. . |
| 0121482 | 10/1984 | European Pat. Off. . |
| 0121812 | 10/1984 | European Pat. Off. . |
| 2479981 | 2/1982 | France ...................................... 370/3 |
| 2496260 | 1/1984 | France ...................................... 370/3 |
| 2120400 | 11/1983 | United Kingdom ............. 350/96.18 |

Primary Examiner—Benedict V. Safourek
Assistant Examiner—Andrew J. Telesz, Jr.
Attorney, Agent, or Firm—Handal & Morofsky

[57] ABSTRACT

Multiplexer-demultiplexer including:
(a) a fiber-carrying element in which the entrance and exit fibers are embedded, with their ends in flush alignment in a plane surface of contact with the following element,
(b) an element carrying the wavelength separation system, with a plane surface of contact with the fiber-carrying element and an opposite plane face of contact with the following element,
(c) an intermediate element of the same index n as the element carrying the wavelength separation system, with a plane face of contact with the element carrying the wavelength separation system, and a spherical face of contact with the following element,
(d) a mirror element with a spherical face of contact with the intermediate element and an opposite spherical face treated to form a concave spherical mirror towards the intermediate element.

18 Claims, 1 Drawing Sheet

WAVELENGTH MULTIPLEXER-DEMULTIPLEXER CORRECTED OF GEOMETRIC AND CHROMATIC ABERRATIONS

TECHNICAL FIELD

The present invention relates to a wavelength multiplexer-demultiplexer having a wavelength separator and a concave mirror, more especially intended to form a component for optical fiber teletransmission equipment.

BACKGROUND ART

It constitutes, in particular, an improvement both to the French patent published under No 2543768, 2543768 corresponds to U.S. Ser. No. 595,739 filed Apr. 2, 1984 now U.S. Pat. No. 4,622,662 and to the French patent published under No 2519148, 2519148 corresponds to U.S. Ser. No. 452,481 filed Dec. 23, 1982 now U.S. Pat. No. 4,583,820.

From the French patent published under No 2479981, and more especially from its second addition published under No 2496260, there is known an integral assembly permitting combination, within a long-distance transmission fiber, of a plurality of luminous fluxes having differing wavelengths, guided by an equal number of input fibers, or indeed, operating in the inverse mode, separation and distribution to a plurality of exit fibers of a plurality of luminous fluxes of differing wavelength guided together by a single transmission fiber.

In such a device, in which the entrance and exit fibers are disposed in the immediate vicinity of the focus of a concave mirror, the latter in a demultiplexer operational mode for example, converts the beam of mixed luminous fluxes received from the entrance fiber into a parallel beam directed towards a plane diffraction grating, and on the other hand focuses on the ends of the exit fibers the various monochromatic parallel beams diffracted by the grating.

The French patent published under No 2519148 describes a similar device, in which separation of the wavelengths is provided by selective multidielectric filter mirrors.

Such devices, whether they include gratings or dielectric mirrors, give better results with a parabolic concave mirror, rather than a spherical one. In fact, the spherical aberrations of a spherical mirror do not permit the achievement of the same degree of stigmatism quality as with a parabolic mirror.

The French patent published under No 2543768 indicates a firt improvement, applied to a grating device, by the formation of a plane dioptric element separating two optical media having differing indices between the concave mirror and the grating, thus making it possible to use a simple spherical mirror. The spherical aberrations of the mirror may in fact then be corrected by an apropriate selection of the indices of the two media of the dioptric element.

Unfortunately, it becomes evident that, in practice, the correction of the spherical aberrations by a plane dioptric element requires a relatively large difference in the indices n and n', for example such as $n \geq 2n'\sqrt{3}$. With currently available glasses, the result of this is differences in chromatic dispersion which are likewise large, and which involve chromatic aberrations and may compel inclination of the plane of flush alignment of the optical reception or emission fibers for the various wavelengths, which increases the difficulties involved in industrial production.

That which has just been stated concerning the problems involved in the use of a plane dioptric element to correct the spherical aberrations in a component making use of a spherical concave mirror and a separation of wavelengths formed by a diffraction grating would also apply in the same way to a component making use of a concave mirror and a separation of wavelengths formed by at least one selective multidielectric filter mirror such as is described in the French patent published under No. 2,519,148.

SUMMARY OF THE INVENTION

The present invention, which is applicable in the same way to both types of component, thus permits both the correction of the spherical aberrations of a spherical concave mirror which can readily be produced industrially and the correction of the chromatic aberrations due to the presence of a dioptric element.

The invention thus relates to a multiplexerdemultiplexer of the type in which the luminous fluxes of differing wavelengths to be mixed or to be separated are carried by optical transmission fibers, the ends of which are disposed in the immediate vicinity of the apparent focus of a concave mirror associated with a wavelength separation system.

According to the invention, it is constituted by at least four transparent elements cemented to one another, these elements being in succession:

(a) a fiber-carrying element, in which the entrance and exit fibers are embedded, with their ends in flush alignment on a plane surface of contact with the following element, (b) an element carrying the wavelength separation system, with a plane surface of contact with the fiber-carrying element and an opposite plane face of contact with the following element, (c) an intermediate element of the same index n as the element carrying the wavelength sseparation system, with a plane face of contact with the element carrying the wavelength separation system, and a spherical face of contact with the following element, (d) a mirror element with a spherical face of contact with the intermediate element and an opposite spherical face treated to form a concave spherical mirror towards the intermediate element and with an index n'different from the index n of the intermediate element, the materials of the mirror and intermediate elements being selected in such a manner as to exhibit chromatic dispersions which are as close as possible, the radius of the spherical surface between the mirror element and the intermediate element being determined as a function of the indices n and n'in order to correct the longitudinal spherical aberrations of the mirror.

According to a particularly advantageous embodiment, the intermediate element is itself formed in two parts separated by a plane surface.

BRIEF DESCRIPTION OF THE DRAWINGS

The invention will be better understood by referring to particular embodiments, which are given by way of example and shown by the accompanying drawings.

Figure 1:
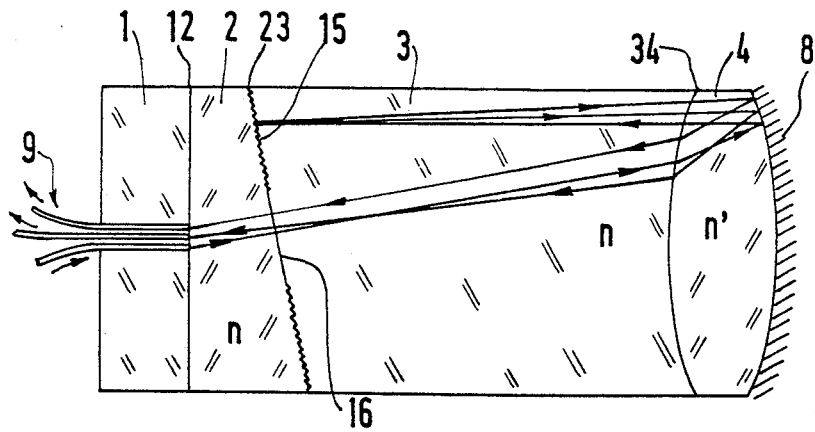
FIG. 1 is a median section of a component constructed according to the invention and making use of a plane diffraction grating.

Referring first of all to FIG. 1, it will be seen that the device shown carries out the same function as that described in FIG. 1 of the edition published under No. 2,496,260, but it is in this instance formed in four elements cemented successively to one another. The element 1 is a simple support for the optical entrance and exit fibers. The element 2 is simply the support for the grating. The lement 3 is an intermediate element, and the element 4 simply comprises the concave mirror.

The fiber-carrying element 1 may advantageously be constructed by utilizing the process described by the French patent published under No. 2,411,424 and concerning a connector for optical fibers; it will be sufficient to produce a single one of the two blocks which would be necessary for a connector. The patent published under No. 2,543,768 states in greater detail a preferred manner of mounting the fibers in the block 1 and of causing their ends to be in flush alignment in the connecting plane 12. The grating-carrying element 2 is a transparent block, one face of which is polished in order to form the plane of connection 12 with the element 1, and the other face of which carries a plane diffraction grating 15. The grating 15 is constructed in the usual manner, that is to say by copying an original engraved or holographic grating, followed by covering with a reflecting metallic coating. In order to permit passage, without deviation, of the light originating from the fibers 9 or arriving thereat, it is necessary to neutralize the grating 15 locally in the zone 16, in which it traverses the aperture cone of the fibers, that is to say the angular zone of acceptance of the light rays in the core of the fibers. In order to neutralize the grating in this zone 16, a photolithographic process will be carried out in order to cause the reflecting coating to be eliminated locally. It will be observed that this does not involve any deterioration of the grating outside of the treated zone and in particular at the boundary of this zone. Moreover, when the face carrying the grating will be cemented to the intermediate element 3 having the same index as the element 2, it will be sufficient to use as cement a resin having the same index as that of the resin forming the support of the grating 15, the latter resin being itself selected in order to exhibit an index as close as possible to that of the two blocks 2 and 3. Thus, by filling the grooves of the grating support, the cement will reestablish complete optical continuity, permitting passage of the light rays without deviation.

The intermediate element 3 exhibits a polished plane face for cementing to the grating 15 of the element 2 and a spherical face 34 to form the surface of connection with the element 4.

On the element 4, the face opposite to the spherical connecting face 34 is itself a spherical surface treated in order to form a concave mirror 8. The element 4 is constructed of a material having an index n' different from the index n of the elements 2 and 3. In this instance, n' is less than n. and the concavity of the surface 34 is opposite to that of the mirror 8. If the selection of the indices n and n' were to lead to the adoption of n less than n', the concavity of the surface 34 should then be of the same sense as that of the mirror 8.

It will be noted that the optical operation of the assembly constructed in this manner is entirely identical to that of the assembly described in U.S. Pat. No. 2,496,260. In the case of operation as a demultiplexer, for example, the mixed luminous flux is guided by one of the fibers 9, the end of which is at the apparent focus of the mirror 8, that is to say at the location of the image of its real focus in the dioptric element 34. After refraction by the dioptric element 34, the rays emerging from the end of the fiber are thus deflected by the mirror 8 in a parralel beam towards the grating 15, which disperses it into a number of parallel beams equal to the number of wavelengths in the mixed luminous flux. By an inverse route, each parallel beam is focused on the end of an exit fiber 9. However, in this instance the selection of the differing indices for the elements 3 and 4 permits correction of the aberrations of the spherical mirror 8 in such a manner that there will be no difficulty in making use of a spherical mirror which is far easier to produce industrially than a parabolic mirror.

Moreover, for the elements 3 and 4 the chromatic dispersion areas which have been selected are substantially equal, permitting avoidance of the introduction of chromatic aberrations. The curvature of the spherical dioptric element 34 is then selected as a function of the indices n and n' of the materials, in such a manner as likewise to compensate the spherical aberration of the mirror.

Figure 2:
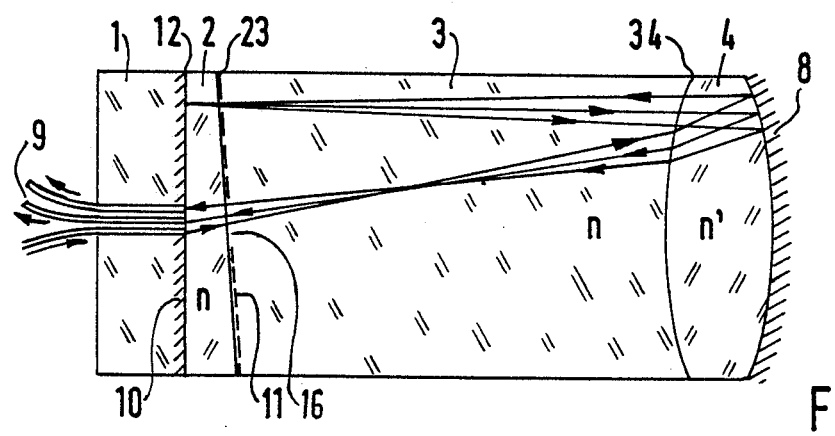
FIG. 2 is a corresponding figure for a component making use of two plane mirrors for the separation of the wavelengths, one mirror being entirely reflecting and the other being a selective mirror having multidielectric coatings.

All the aforegoing is entirely transferable to the case of FIG. 2, in which the element 2 is treated on the face 12 so as to form a plane mirror 10, except, of course, in the zone directly facing the ends of the fibers 9. The opposite face 23, with the exception of the central zone 16 which intersects the aperture cone of the fibers, is treated with multidielectric coatings so as to form a selective mirror which only reflects a certain band of wavelengths and allows the others to pass without deviation. Thus, the beam of mixed luminous flux guided by one of the fibers 9, the end of which will be in the immediate vicinity of the apparent focus of the mirror 8, will be deflected in a parallel beam towards the mirrors 10 and 11. A part of the luminous flux will be reflected by the mirror 11 and refocused by the mirror 8 towards another one of the fibers 9; the other part of the luminous flux, traversing the mirror 11, will only be reflected by the mirror 10 and deflected in a different direction towards the mirror 8, which will focus it towards a third fiber 9.

Figure 3:
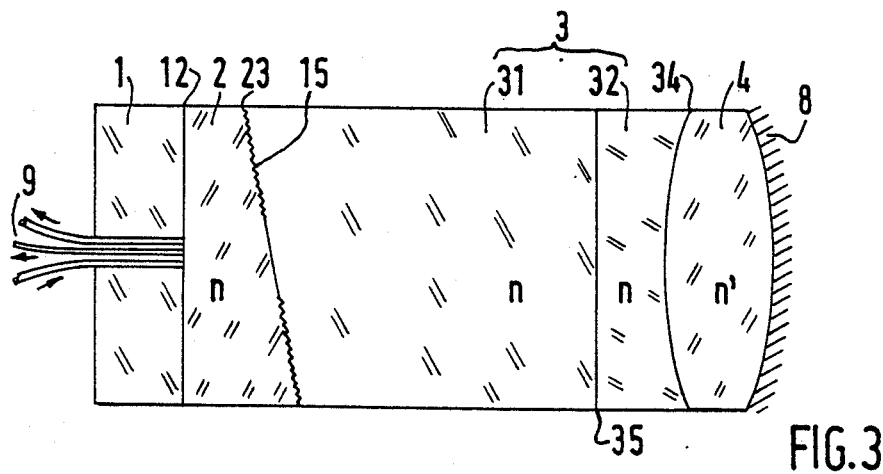
FIG. 3 shows a variant of the device of FIG. 1, with an intermediate element which is itself in two parts.

Reference will finally be made to FIG. 3, which shows an embodiment variant facilitating regulation of the device. In this instance, the intermediate element 3 is in two parts 31 and 32, both for example constructed of a material having the same index n as the element 2, and separated by a connecting plane 35. In the case of the embodiments according to FIGS. 1 and 2, the regulation of the alignment of the fibers can take place prior to final cementing only by plane sliding of the fibercarrying block 1 in the connecting plane 12. In the embodiment according to FIG. 3, it is also possible to regulate the assembly 32-4, prior to cementing, in relation to the block 31 and to the remainder of the component by sliding in the connecting plane 35.

EXAMPLE

An assembly according to FIG. 1 was constructed with:

for the elements 2 and 3 a glass sold under the reference RGN6 by Schott, having an index varying from 1.58015 for a wavelength of 875 nm to 1.58420 for a wavelength of 706.5 nm, for the element 4 a glass sold under the reference BK7 by Schott, having an index varying from 1.509326 for a wavelength of 875 nm to 1.51289 for a wavelength of 706.5 nm, a radius of 130.19 mm for the reflecting face of the mirror 8, a radius of 115.50 mm for the spherical surface 34, a distance of 63.826 mm between the end plane 12 of the fibers and the crown of the spherical surface 34. This results in a focal length of 71.529 mm and, for the range of wavelengths from 875 to 706 nm the longitudinal displacement of the focus as a function of the wavelength and of the height of incidence of the rays within the system, for fibers having a numerical aperture of 0.29, is less than ±15 microns.

In an embodiment in which the glass IRGN6 is replaced by a glass sold by the same supplier under the reference PSK52, the longitudinal displacement is reduced to ±8 microns for a focal length of 72.137 mm.

The invention is certainly not strictly limited to the embodiments which have been described simply by way of example, but it also covers the embodiments which differ therefrom only by matters of detail, by variants of implementation or by the application of equivalent means.

I claim:

1. A multiplexer-demultiplexer of the type in which light of different wavelengths to be combined or to be separated and conducted by optical transmission fibers, and in which the ends of said fibers are disposed in the immediate vicinity of the apparent focus of a concave mirror, which concave mirror is assoiacted with a wavelength separation system, comprising:
   (a) a fiber-carrying element in which entrance and exit fibers are embedded, with their ends in flush alignment with a planar surface on said fiber carrying element;
   (b) a transparent element having an index of refraction n and secured to the wavelength separation system with a planar surface in contact with and cemented to the planar surface of the fiber-carrying element and an opposite planar face;
   (c) a transparent intermediate element having the same index of refraction n as said transparent element, said transparent element secured to the wavelength separation system and said transparent intermediate element having a planar face in contact with and cemented to the opposite planar face of said transparent element and having an opposite spherical face;
   (d) a transparent mirror element having a mating spherical face in contact with said intermediate element and an opposite spherical face treated to form a concave spherical mirror reflecting light towards the intermediate element and having and index of refraction n' different from the index of refraction of the intermediate element, the materials of said transparent intermediate and said transparent mirror elements being selected in such a manner as to exhibit chromatic dispersions which are as close as possible, the radius of the spherical face between the mirror element and the intermediate element being determined as a function of the indices of refraction n and n' to compensate for longitudinal spherical aberrations of the mirror.

2. The multiplexer-demultiplexer as claimed in claim 1, wherein the wavelength separation system is a defraction grating.

3. The multiplexer-demultiplexer as claimed in claim 1, wherein the wavelength separation system comprises an assembly of plane mirrors, at least one of said mirrors being provided with multidielectric filter coatings, and at least one of said mirrors positioned with an inclination, said inclination being different from that of the spherical mirror with respect to the axis of the spherical mirror.

4. The multiplexer-demultiplexer as claimed in claim 1, wherein the index n of the intermediate element is greater than the index n' of the mirror element, and wherein the mirror element is biconvex.

5. The multiplexer-demultiplexer as claimed in claim 1, wherein the index n of the intermediate element is less than the index n' of the mirror element, and wherein the concavity of the spherical surface between the mirror element and the intermediate element is directed in the same sense as that of the mirror.

6. The multiplexer-demultiplexer as claimed in claim 1, wherein the intermediate element is itself formed in two parts separated by a plane surface.

7. A multiplexer-demultiplexer as in claim 1, wherein said spherical face of said transparent intermediate element is concave.

8. A multiplexer-demultiplexer for combining or separating light of different wavelengths, comprising:
   (a) a first solid transparent member having a first end and a spherically shaped second end and a first index of refraction, said first end being configured and dimensioned to form a support for a focusing surface;
   (b) reflective focusing means positioned adjacent said first end;
   (c) a second solid transparent member having a third end conforming to said second end and a fourth end and a second index of refraction, said third end being positioned against said second end and said second index of refraction being different from said first index of refraction, said first and second members having substantially the same chromatic dispersions, and said spherically shaped second end and second conforming third end having a value of curvature which minimizes longitudinal spherical aberrations of said reflective focusing means;
   (d) first light conducting means for sending or receiving light, said first light conducting means being positioned adjacent said fourth end and positioned at a first end of a path along which light is sent or received, said path extending from said first light conducting means toward said reflective means;
   (e) diffracting means carried by said second transparent member and positioned proximate said fourth end, for diffracting light incident on said diffracting means along said path from said reflective focusing means and reflecting it along said path back toward said reflective focusing means, reflection occurring at an angle which is a function of the wavelength of light travelling along said path; and
   (f) second light conducting means for receiving or sending light sent or received by said first light conducting means, respectively, said second light conducting means being positioned proximate said fourth end and positioned at the end of said path to receive or send light passing along said path from or to said reflective focusing means.

9. A multiplexer-demultiplexer as in claim 8 wherein said diffracting means is disposed between said third and fourth ends.

10. A multiplexer-demultiplexer as in claim 9 wherein said reflective focusing surface is a concave mirror.

11. A multiplexer-demultiplexer as in claim 10, wherein said first and second light conducting means are substantially in the same plane as the focal point of said concave mirror.

12. A multiplexer-demultiplexer as in claim 11, wherein the cross-sections of said first and second solid transparent members are circular.

13. A multiplexer-demultiplexer as in claim 11, wherein said second light conducting means comprises a plurality of fiber optic members each positioned to receive light of different wavelengths diffracted by said diffracting means.

14. A multiplexer-demultiplexer as in claim 8, wherein said first index of refraction is lesser than said second index of refraction.

15. A multiplexer-demultiplexer as in claim 8, wherein said second light conducting means comprises an optical fiber mounted with the fiber end flush with a plane contact surface of said fourth end.

16. A multiplexer-demultiplexer as in claim 8, wherein said second light conducting means comprises a plurality of optical fibers at a plurality of positions corresponding to path ends for light of different wavelengths.

17. A device as in claim 8, wherein said first end is concave, said second and third ends are concave and oriented in the same direction and secured to each and said first index of refraction is greater than said second index of refraction.

18. A multiplexer-demultiplexer for combining or separating light of different wavelengths, comprising:
    (a) a first solid transparent member having a first end and a spherically shaped second end and a first index of refraction, said first end being configured and dimensioned to form a support for a focusing surface;
    (b) reflective focusing means positioned adjacent said first end;
    (c) a second solid transparent member having a third end conforming to said second end and a fourth end and a second index of refraction, said third end being positioned against said second end and said second index of refraction being different from said first index of refraction, said first and second members having substantially the same chromatic dispersions, and said spherically shaped second end and said conforming third end having a value of curvature which minimizes longitudinal spherical aberrations of said reflective focusing means;
    (d) first light conducting means for sending or receiving light, said first light conducting means being positioned adjacent said fourth end and positioned at a first end of a path along which light is sent or received, said path extending from said first light conducting means toward said reflective means;
    (e) diffracting means carried by said second transparent member and positioned proximate said fourth end, for diffracting light incident on said diffracting means along said path from said reflective focusing means and reflecting it along said path back toward said reflective focusing means, reflection occurring at an angle which is a function of the wavelength of light travelling along said path; and
    (f) second light conducting means for receiving or sending light sent or received by said first light conducting means, respectively, said second light conducting means being positioned proximate said fourth end and positioned at the end of said path to receive or send light passing along said path from or to said reflective focusing means, said second light conducting means comprising a number of fibers and said first index of refraction being lesser than said second index of refraction.

* * * * *